(12) United States Patent
Iida

(10) Patent No.: US 6,679,631 B2
(45) Date of Patent: Jan. 20, 2004

(54) LINEAR GUIDE MECHANISM

(75) Inventor: Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/143,001

(22) Filed: May 13, 2002

(65) Prior Publication Data

US 2002/0168121 A1 Nov. 14, 2002

(30) Foreign Application Priority Data

May 14, 2001 (JP) ........................................ 2001-143802

(51) Int. Cl.[7] ................................................. F16C 19/34
(52) U.S. Cl. .......................................... 384/58; 384/55
(58) Field of Search ........................... 384/450, 42, 43, 384/44, 50, 53, 55, 41, 58

(56) References Cited

U.S. PATENT DOCUMENTS

| 4,375,195 A | * | 3/1983 | Tsuboi | 104/246 |
| 4,496,197 A | * | 1/1985 | Kwon | 384/44 |
| 4,944,608 A | * | 7/1990 | Osawa | 384/58 |
| 4,988,215 A | * | 1/1991 | Osawa | 384/44 |
| 5,273,367 A | * | 12/1993 | Tanaka | 384/45 |
| 5,391,003 A | * | 2/1995 | Ooya | 384/44 |
| 5,537,912 A | * | 7/1996 | Miyamoto et al. | 92/88 |
| 5,735,610 A | * | 4/1998 | Mark et al. | 384/42 |
| 5,806,986 A | * | 9/1998 | Barth et al. | 384/45 |
| 5,897,212 A | * | 4/1999 | Tsukada et al. | 384/45 |
| 6,308,821 B1 | | 10/2001 | Asai et al. | 198/750.7 |

FOREIGN PATENT DOCUMENTS

| JP | 2595089 | 3/1999 |
| JP | 11-280707 | 10/1999 |
| JP | 2000-304004 | 10/2000 |

OTHER PUBLICATIONS

All Japanese citations are discussed in the present specification, and corresponding English documents and/or summaries of relevant portions of relevant portions of these documents have been included.

* cited by examiner

*Primary Examiner*—David A. Bucci
*Assistant Examiner*—Julie K. Smith
(74) *Attorney, Agent, or Firm*—Paul A. Guss

(57) ABSTRACT

An angle θ, which is formed by an axis of a horizontal roller rotatably attached to a slider and an axis of an inclined roller, is about 60°, and a load-bearing capacity of the horizontal roller is about a half of that of the inclined roller. Accordingly, the load resistance is substantially constant in four directions, i.e., in upward, downward, rightward, and leftward directions irrespective of attachment posture.

13 Claims, 15 Drawing Sheets

LINEAR GUIDE MECHANISM

BACKGROUND OF THE INVENTION

1. Field of the Invention

The present invention relates to a linear guide mechanism having, for example, a base member and a slider which are provided displaceably relatively linearly.

2. Description of the Related Art

A linear guide, in which a slider is linearly displaced in the axial direction of an actuator body, has been hitherto used, for example, for a linear actuator.

Such a linear guide is disclosed in Japanese Utility Model Registration No. 2595089, in which a horizontal roller is arranged at a horizontal portion of a main slider body, and an inclined roller is arranged at an inclined portion of a side slider.

Japanese Laid-Open Patent Publication No. 11-280707 discloses a structure in which a rotary wheel is rotated while making abutment against a guide surface having a substantially V-shaped cross section formed on a side wall of a fixed section to linearly guide a movable section.

However, in the Japanese Utility Model Registration No. 2595089, the angle of intersection, which is formed by the axis of the horizontal roller and the axis of the inclined roller, is about 40°. For this reason, the floating load resistance generated upon the ceiling attachment and the lateral load resistance generated upon the wall surface attachment are decreased with respect to the vertical load resistance generated upon the horizontal attachment for the apparatus respectively. Therefore, the apparatus is deficient in isotropic load resistance for equivalently bearing the load irrelevant to the attachment posture of the apparatus.

In the Japanese Laid-Open Patent Publication No. 11-280707, there is no means for adjusting the clearance between the fixed section and the movable section at all. Therefore, it is impossible to absorb the dimensional error generated, for example, by production errors.

SUMMARY OF THE INVENTION

A general object of the present invention is to provide a linear guide mechanism which makes it possible to isotropically bear a definite load irrespective of attachment posture.

A principal object of the present invention is to provide a linear guide mechanism which makes it possible to guide a slider and a base member relatively smoothly by absorbing dimensional errors of each constitutive part.

According to the present invention, an angle $\theta$, which is formed by a first load-receiving element and a second load-receiving element, has a predetermined value within a range of $45° \leq \theta < 90°$, and a ratio between a load-bearing capacity RA of the first load-receiving element and a load-bearing capacity RB of the second load-receiving element has a predetermined value within a range of $1.2 \leq RB/RA \leq 2.7$.

Therefore, in the present invention, even when the attachment posture is changed, for example, into the horizontal attachment in which the base member is attached to a horizontal surface of an unillustrated member in a substantially horizontal state, the ceiling attachment in which the base member is attached to an unillustrated ceiling surface upside down with respect to the horizontal attachment, or the wall surface attachment in which the base member is attached along an unillustrated wall surface as a substantially vertical surface, then the ratio is substantially equivalent for the loads supported by the first load-receiving element and the second load-receiving element respectively and the respective load-bearing capacities, and thus the isotropic load resistance is achieved.

In this arrangement, a clearance-adjusting section is provided for only an inclined roller as the second load-receiving element, and the clearance-adjusting section adjusts a clearance between a roller section of the inclined roller and the inclined surface guide track. Accordingly, a certain level of the dimensional accuracy in the height direction is maintained.

Further, in the present invention, it is assumed that the angle, which is formed by an axis of a horizontal roller as the first load-receiving element and an axis of the inclined roller as the second load-receiving element, is $\theta$, the load-bearing capacity of the horizontal roller is RA, and the load-bearing capacity of the inclined roller is RB. On this assumption, $\theta$, RA, and RB are set so that $45° \leq \theta < 73°$ and $1.2 \leq RB/RA \leq 2.7$ are satisfied respectively. Accordingly, the floating load resistance is substantially the same as the vertical load resistance.

When $\theta$, RA, and RB are set so that $45° \leq \theta < 90°$ and $1.6 \leq RB/RA \leq 2.7$ are satisfied respectively, the lateral load resistance is substantially the same as the vertical load resistance.

Further, when $\theta$, RA, and RB are set so that $53° \leq \theta < 72°$ and $1.7 \leq RB/RA \leq 2.7$ are satisfied respectively, all of the vertical load resistance, the floating load resistance, and the lateral load resistance are substantially identical.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
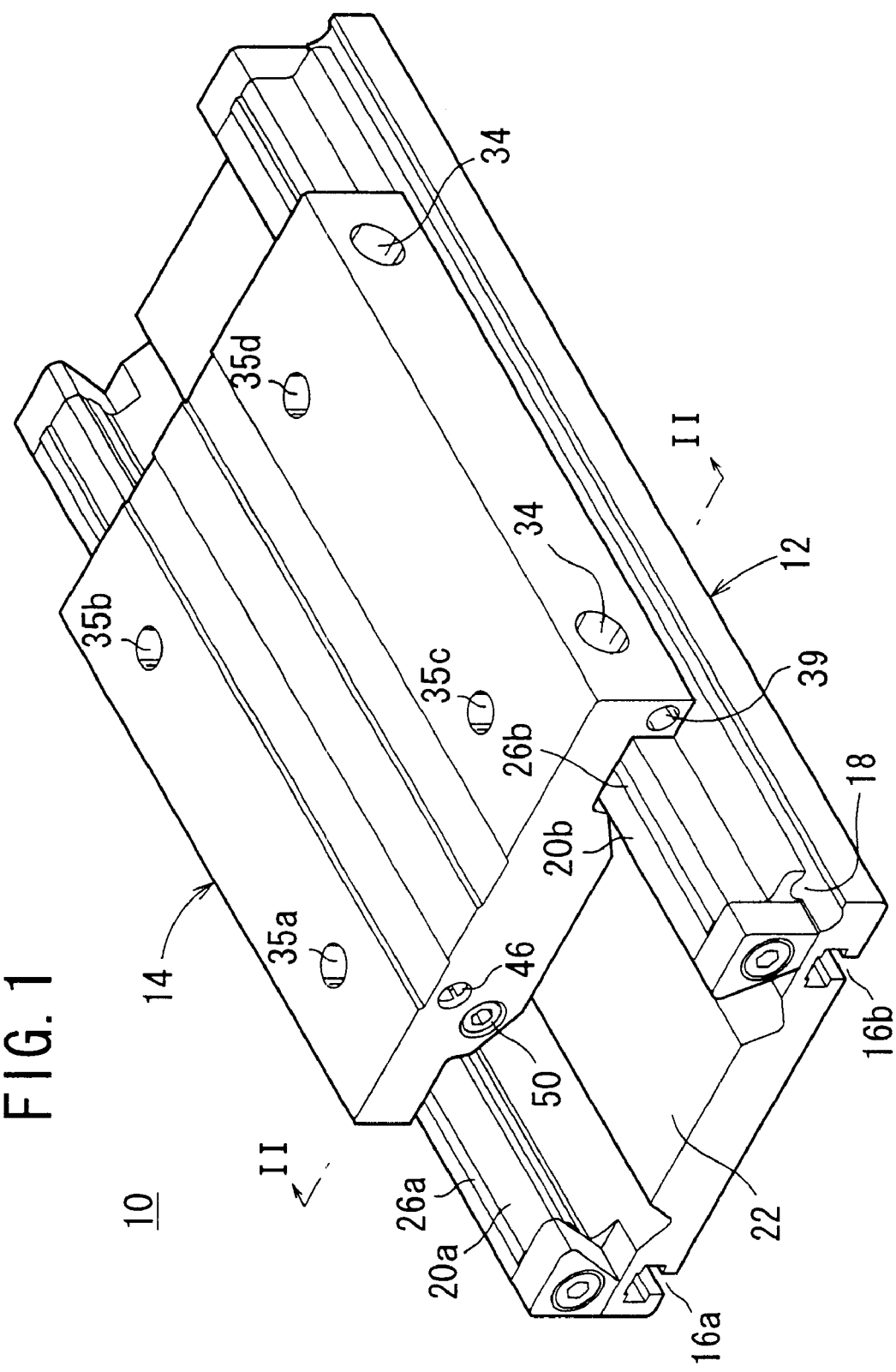
FIG. 1 is a perspective view illustrating a linear guide mechanism according to an embodiment of the present invention.
Figure 2:
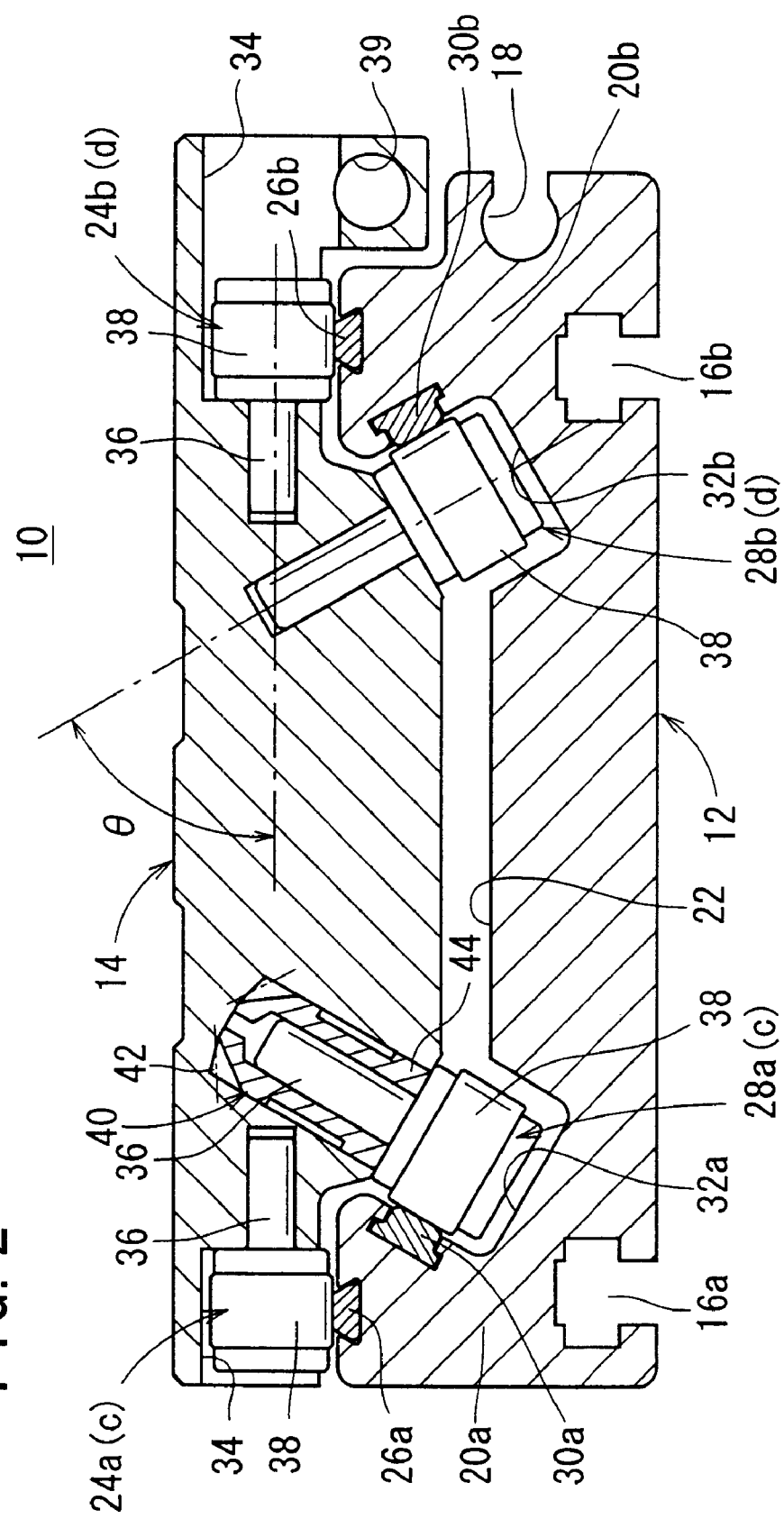
FIG. 2 is a vertical sectional view taken along a line II—II shown in FIG. 2.

With reference to FIGS. 1 and 2, reference numeral 10 indicates a linear guide mechanism according to an embodiment of the present invention.

The linear guide mechanism 10 has a base member 12 which is provided relatively displaceably and which is formed with horizontal surface and inclined surface guide tracks, and a slider 14 which is displaceable along the guide tracks. A pair of attachment long grooves 16a, 16b, each of which has a T-shaped cross section and which extend in the axial direction, are formed substantially in parallel on the bottom surface of the base member 12. A sensor attachment groove 18, which has a circular arc-shaped cross section, is formed on one side surface which is substantially perpendicular to the bottom surface.

A pair of mutually opposing side sections 20a, 20b are formed for the base member 12 so that the side sections 20a, 20b are parallel to the axis of the base member 12. A recess 22 is formed between one side section 20a and the other side section 20b. A pair of horizontal rails 26a, 26b, which function as the horizontal surface guide tracks for guiding horizontal rollers (first load-receiving elements) 24 (hereinafter referred to as 24a to 24d, if necessary) as described later on, are installed substantially in parallel in the axial direction onto horizontal sections on the upper surfaces of the side sections 20a, 20b.

Inclined sections, each of which is inclined by a predetermined angle, are formed on the inner wall side disposed closely to the horizontal sections. A pair of inclined rails 30a, 30b, which function as the inclined surface guide tracks for guiding inclined rollers (second load-receiving elements) 28 (hereinafter referred to as 28a to 28d, if necessary) as described later on, are installed substantially in parallel in the axial direction onto the inclined sections.

A pair of cutout grooves 32a, 32b, each of which is inclined by a predetermined angle and which extend in the axial direction, are formed on the recess 22 of the base member 12 (see FIG. 2). The inclined rollers 28a (28c), 28b (28d) are provided so that they face the cutout grooves 32a, 32b.

Figure 3:
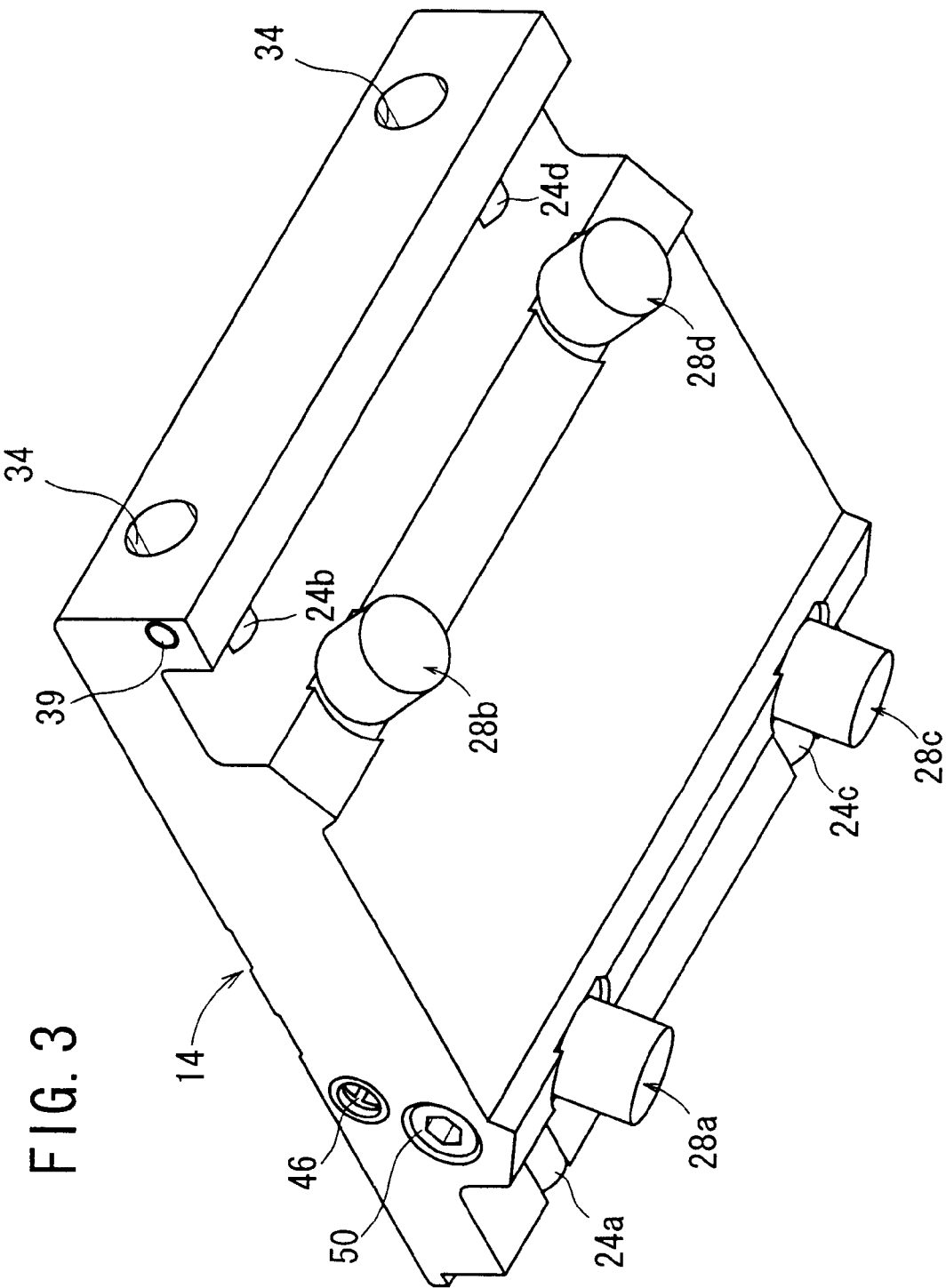
FIG. 3 is a perspective view as viewed on a bottom surface side of a slider shown in FIG. 1.
Figure 4:
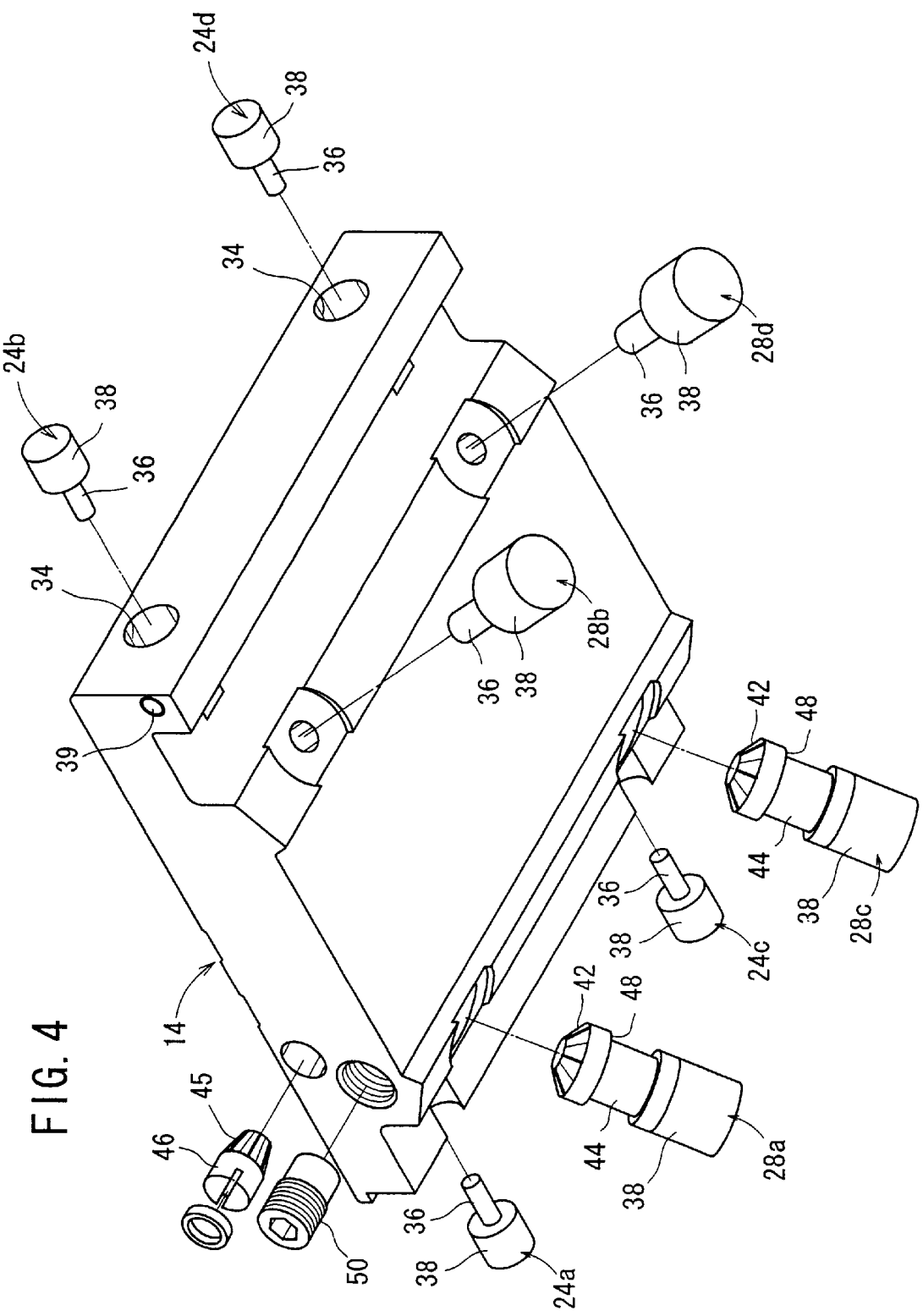
FIG. 4 is an exploded perspective view illustrating the slider shown in FIG. 3.

As shown in FIGS. 3 and 4, the slider 14 has the four horizontal rollers 24a, 24d which are rotatably attached mutually opposingly in substantially horizontal directions by being inserted into a plurality of insertion holes 34 formed through the side surfaces, and the four inclined rollers 28a to 28d which are provided in the horizontal rollers 24a to 24d and which are rotatably attached while being inclined by predetermined angles so that the inclined rollers 28a to 28d face the cutout sections 32a 23b of the base member 12 (see FIG. 2).

Each of the horizontal rollers 24a to 24d and the inclined rollers 28a to 28d has a pin section 36 and a roller section 38. Each of the roller sections 38 is rotatably supported by a plurality of unillustrated needle rollers arranged along the inner circumferential surface of the roller section 38. The roller sections 38 are provided so that they are smoothly rotated by making abutment against the horizontal surface and inclined surface guide tracks of the base member 12 respectively.

The diameter of the roller section 38 of the horizontal roller 24a to 24d is smaller than the diameter of the inclined roller 28a to 28d. A magnet insertion hole 39 for installing an unillustrated magnet is formed on one side surface of the slider 14. Four workpiece attachment holes 35a to 35d are formed on the upper surface of the slider 14 (see FIG. 1).

In this arrangement, as described later on, the angle θ, which is formed by intersection of the axis of the horizontal roller 24 and the axis of the inclined roller 28, is about 60° (see FIG. 2). Further, the load-bearing capacity of the horizontal roller 24 is about the half of the load-bearing capacity of the inclined roller 28. The load-bearing capacity of each of the horizontal roller 24 and the inclined roller 28 depends on the diameter of the unillustrated needle rollers interposed between the roller section 38 and the pin section 36. It is assumed that the load-bearing capacity is set by the basic dynamic load rating supported by the needle rollers.

As shown in FIG. 2, one of the inclined rollers 28a (28c) is provided with a clearance-adjusting section 40 for adjusting the clearance between the base member 12 and the slider 14.

Figure 5:
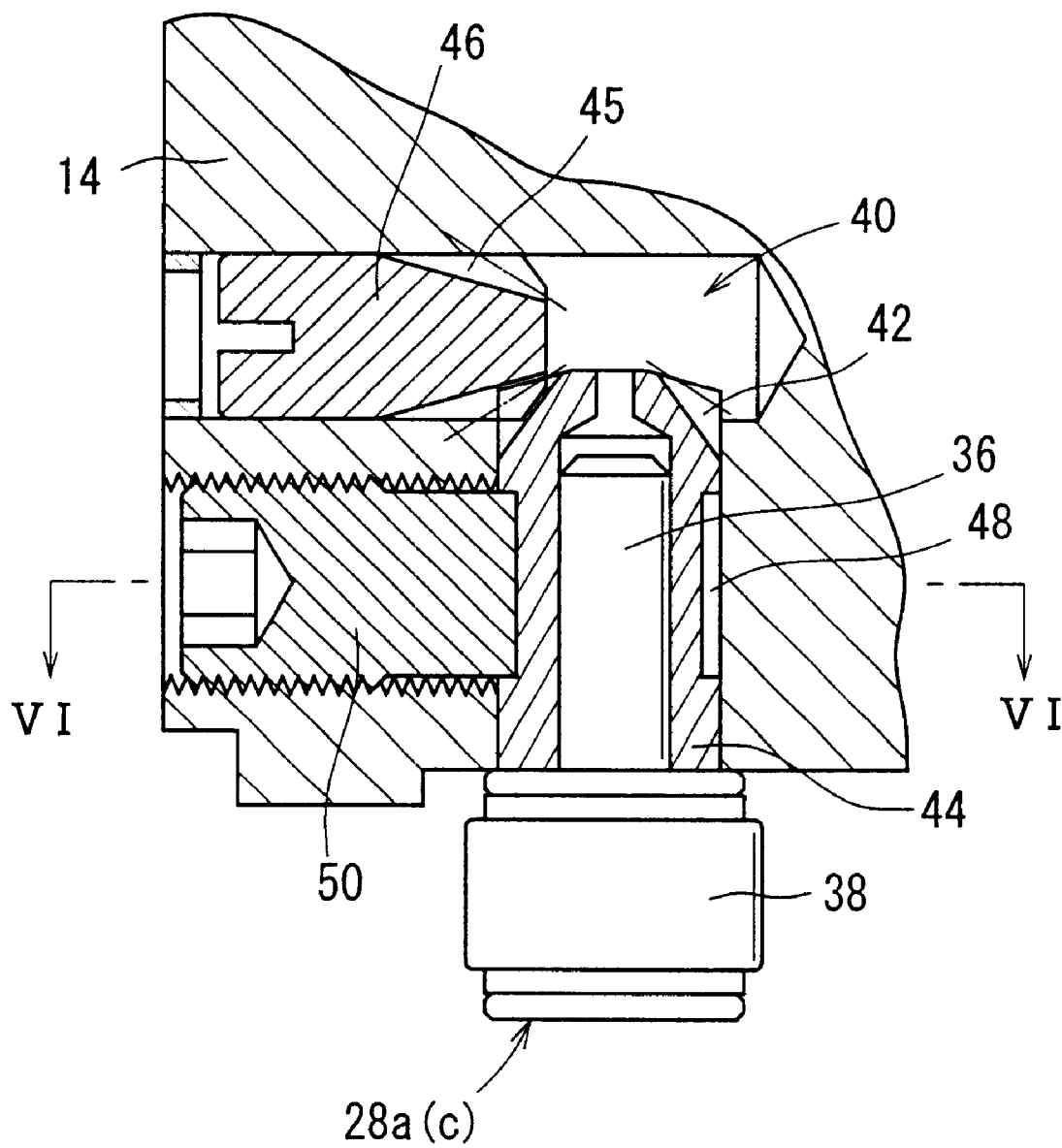
FIG. 5 is a lateral sectional view with partial omission illustrating an arrangement of a clearance-adjusting section.
Figure 6:
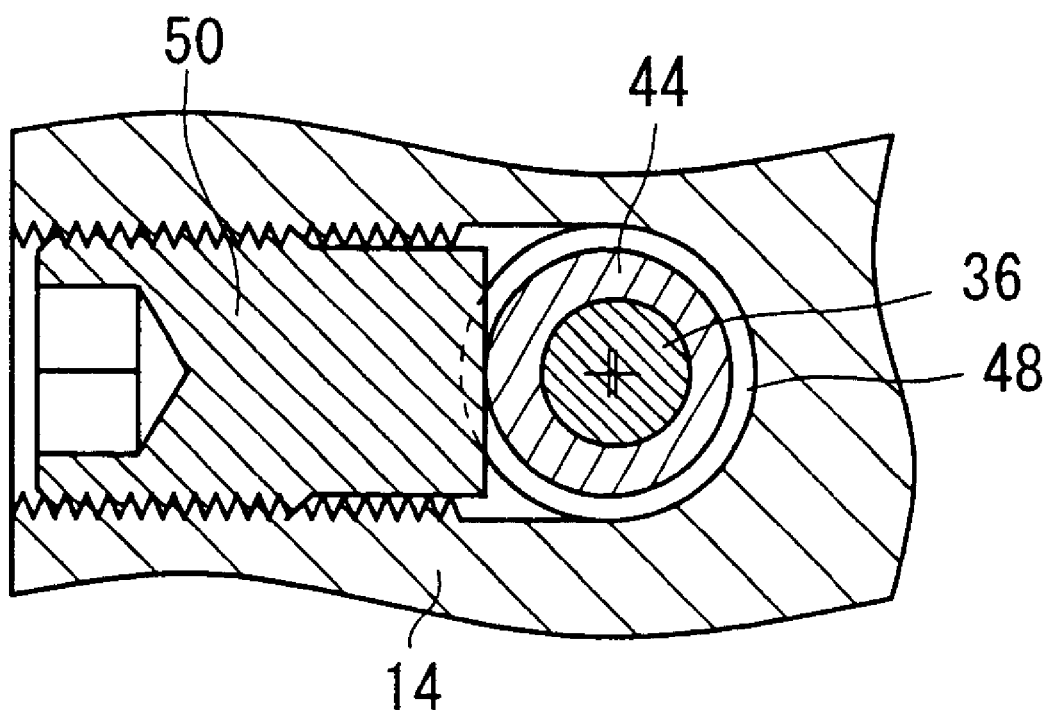
FIG. 6 is a longitudinal sectional view taken along a line VI—VI shown in FIG. 5.

As shown in FIGS. 5 and 6, the clearance-adjusting section 40 comprises a holding member 44 to which the pin section 36 of the inclined roller 28a (28c) is rotatably attached in an eccentric state and which has a bevel-shaped gear section 42 formed at one end, a screw member 46 which is formed with a bevel-shaped gear section 45 for being meshed with the bevel-shaped gear section 42 and for which the screwing amount is adjustable from the outside, and a stopper member 50 which abuts against a circumferential groove 48 of the holding member 44 to fasten the screw member 46.

In this arrangement, the spacing distance between the guide surface of the inclined rail 30a and the roller section 38 of the inclined roller 28a (28c) rotatably attached in the eccentric state can be adjusted to adjust the degree of abutment by rotating the screw member 46 to rotate the holding member 44 by the aid of the mutually meshed bevel-shaped gear sections 42, 45.

Therefore, even when a dimensional error arises due to the production error or the like, the minute clearance between the slider 14 and the base member 12 can be appropriately adjusted by rotating the eccentric inclined roller 28a (28c) by using the clearance-adjusting section 40 to adjust the degree of abutment with respect to the inclined rail 30a.

The clearance-adjusting section 40 may be provided for the inclined roller 28a in place of the horizontal roller 24a. By doing so, the clearance can be conveniently adjusted without moving the slider 14 upwardly/downwardly in the height direction. As a result, it is possible to highly accurately retain the dimension of the entire apparatus in the height direction.

The linear guide mechanism 10 according to the embodiment of the present invention is basically constructed as described above. Next, its function and effect will be explained.

At first, explanation will be made below for the isotropic load resistance to obtain substantially uniform load resistances supported by the horizontal roller 24 and the inclined roller 28 respectively even when the attachment posture is changed, for example, into the horizontal attachment in which the base member 12 of the linear guide mechanism 10 is attached to a horizontal surface of an unillustrated member in a substantially horizontal state, the ceiling attachment in which the base member 12 is attached to an unillustrated ceiling surface upside down with respect to the horizontal attachment, or the wall surface attachment in which the base member 12 is attached along an unillustrated wall surface as a substantially vertical surface.

Figure 7:
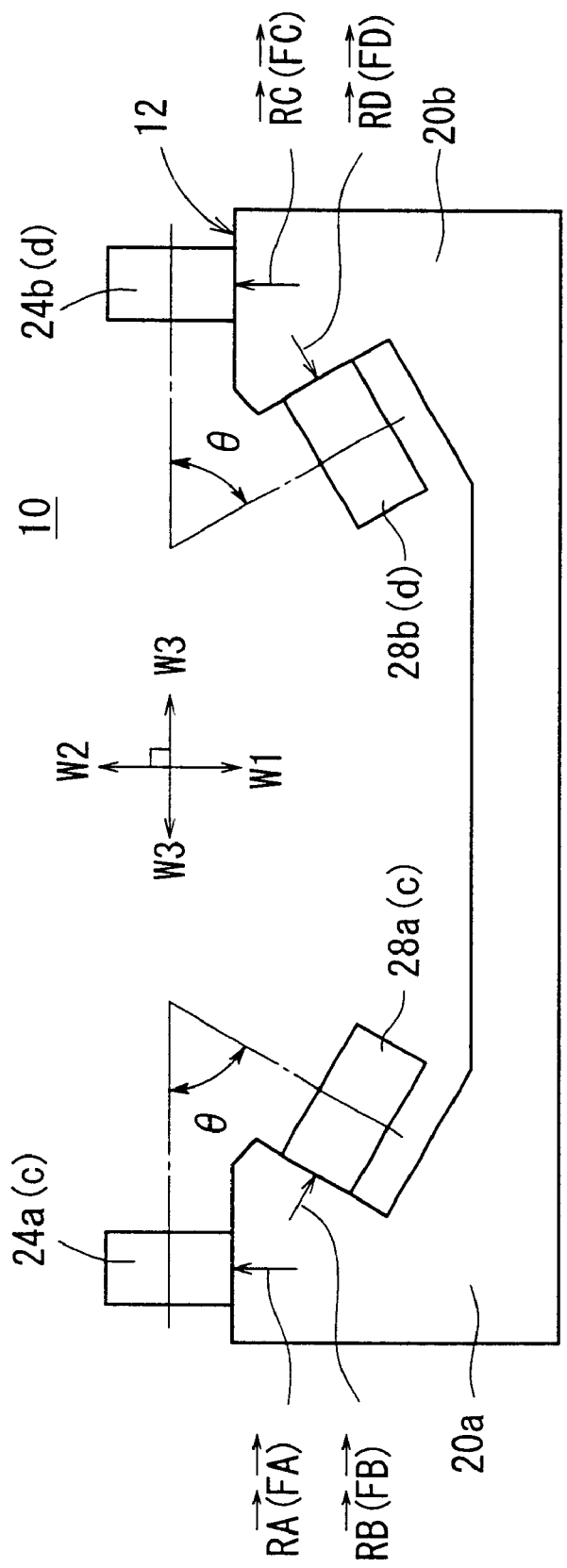
FIG. 7 is a schematic side view illustrating a base member, to be used to illustrate the isotropy of the load.

In this embodiment, as shown in FIG. 7, it is assumed that the load-bearing capacity of the horizontal roller 24a on one side section 20a of the base member 12 is represented by vector RA (hereinafter referred to as RA), the load-bearing capacity of the inclined roller 28a is represented by vector RB (hereinafter referred to as RB), the load-bearing capacity of the horizontal roller 24b on the other side section 20b of the base member 12 is represented by vector RC (hereinafter referred to as RC), the load-bearing capacity of the inclined roller 28b is represented by vector RD (hereinafter referred to as RD), and the loads, which are applied to the horizontal roller 24c, the inclined roller 28c, the horizontal roller 24d, and the inclined roller 28d are represented by vectors FA, FB, FC, and FD respectively.

In this case, it is assumed that RA=RC=FA=FC and RB=RD=FB=FD. On this assumption, when the base member 12, which constitutes the linear guide mechanism 10, is attached to an unillustrated member in the horizontal state (horizontal attachment), the vertical load resistance W1 is RA+RC+FA+FC=4RA.

When the slider 14, which constitutes the linear guide mechanism 10, is attached to a ceiling surface of an unillustrated member (ceiling attachment), the floating load resistance W2 is (RB+RD+FB+FD) cos θ=4 RB cos θ.

When the base member 12, which constitutes the linear guide mechanism 10, is attached to a wall surface of an unillustrated member in the substantially vertical state (wall surface attachment), the lateral load resistance W3 is (RB+FB) sin θ=2 RB sinθ.

In this case, assuming that W1=W2=W3 is given:

$$4\ RA = 4\ RB\ \cos\theta = 2\ RB\ \sin\theta.$$

Accordingly, θ is determined by giving 2 cosθ=sinθ.

Further, there is given tan θ=2. As a result, there is given θ=$\tan^{-1}$2=63.4°.

As for the ratio of the load-bearing capacity between the horizontal roller 24a (24c) and the inclined roller 28a (28c), there is given RA=RB cosθ=0.44 RB. Therefore, there is given RA:RB=1:2.23.

In the embodiment of the present invention, the horizontal roller 24 is designed so that the axis of the horizontal roller 24 is substantially coincident with the substantially horizontal surface. The angle θ of the intersection between the axis of the horizontal roller 24 and the axis of the inclined roller 28 is about 60° (theoretical value: 63.4°). Further, the load-bearing capacity RA of the horizontal roller 24 is about the half (theoretical value: 1/2.23) of the load-bearing capacity RB of the inclined roller 28. Accordingly, it is possible to achieve the four-directional isotropic load resistance (four-directional equivalent load) in which the load resistance performance is equivalent in the upward and downward directions and in the rightward and leftward directions respectively (W1=W2=W3).

The clearance-adjusting section 40 is provided for the inclined roller 28 not for the horizontal roller 24. Accordingly, the slider 14 is not displaced in the upward and downward directions even when the clearance between the base member 12 and the slider 14 is adjusted. It is possible to retain the dimensional accuracy in the height direction. Further, the horizontal roller 24 is substantially in parallel to the upper surface of the slider 14. Therefore, the machining dimensional accuracy is enhanced, and the machining operation can be performed with ease.

Even when bending moment is applied to the slider 14, the loads supported by the horizontal rollers 24 and the inclined rollers 28 are different from each other. However, the load is supported with the same ratio in relation to the load-bearing capacities of the horizontal roller 24 and the inclined roller 28. Therefore, it is possible to efficiently absorb the bending moment, and it is possible to improve the moment resistance characteristics.

First Comparative Example is now given, for example, in which the slider is supported by only a plurality of unillustrated horizontal rollers. In this case, the vertical load resistance and the floating load resistance can be made substantially identical respectively. However, the lateral load resistance is zero.

Further, Second Comparative Example is given, for example, in which the slider is supported by a plurality of unillustrated horizontal rollers and vertical rollers. In this case, the vertical load resistance and the lateral load resistance can be made substantially identical respectively. However, the floating load resistance is zero.

Therefore, the supporting system, which is constructed by combining the horizontal rollers 24 and the inclined rollers 28 as in the embodiment of the present invention, makes it possible to obtain the regulation in all directions without increasing the number of rollers as compared with First and Second Comparative Examples. According to the embodiment of the present invention, it is possible to achieve the desired load resistance performance while maintaining the stable linearity.

Figure 8:
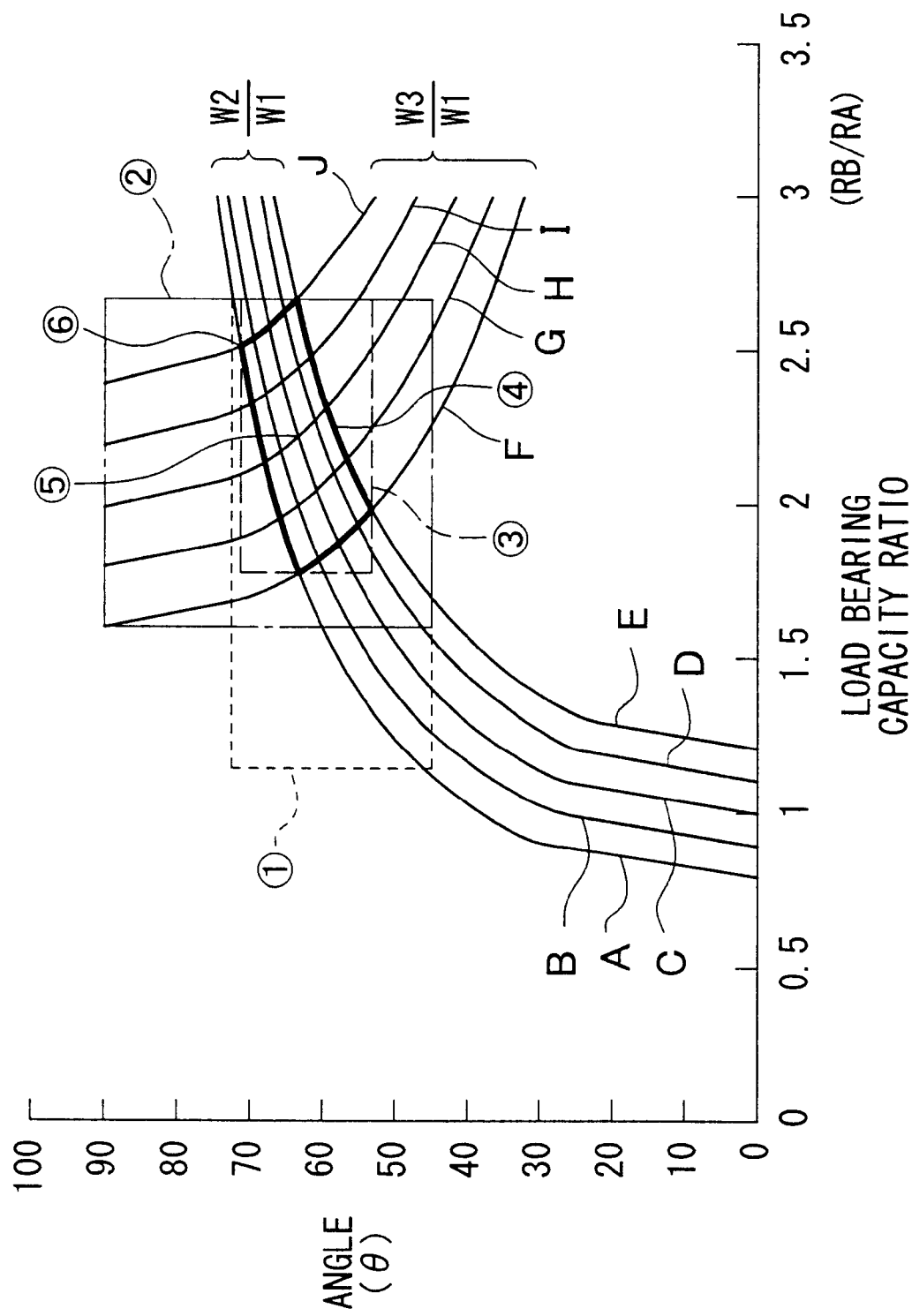
FIG. 8 shows characteristic curves illustrating the relationship between the load-bearing capacity ratio and the angle formed by the horizontal roller and the inclined roller.

Next, FIG. 8 shows the relationship between the angle θ formed by the axes of the horizontal roller 24 and the inclined roller 28 and the load-bearing capacity ratio (RB/RA) between the horizontal roller 24 and the inclined roller 28.

In FIG. 8, characteristic curves A to E represent floating load resistance ratios (W2/W1) on the basis of the vertical load resistance respectively. The characteristic curve A represents the case in which (W2/W1) is 0.8, the characteristic curve B represents the case in which (W2/W1) is 0.9, the characteristic curve C represents the case in which (W2/W1) is 1, the characteristic curve D represents the case in which (W2/W1) is 1.1, and the characteristic curve E represents the case in which (W2/W1) is 1.2.

In FIG. 8, characteristic curves F to J represent lateral load resistance ratios (W3/W1) on the basis of the vertical load resistance respectively. The characteristic curve F represents the case in which (W3/W1) is 0.8, the characteristic curve G represents the case in which (W3/W1) is 0.9, the characteristic curve H represents the case in which (W3/W1) is 1, the characteristic curve I represents the case in which (W3/W1) is 1.1, and the characteristic curve J represents the case in which (W3/W1) is 1.2.

In FIG. 8, an area of (1) surrounded by broken lines indicates a range in which the angle θ is not less than 45° and not more than 73°, the load-bearing capacity ratio RB/RA is not less than 1.2 and not more than 2.7, and the vertical load resistance (W1) is substantially coincident with the floating load resistance (W2).

An area of (2) surrounded by dashed lines indicates a range in which the angle θ is not less than 45° and not more than 90°, the load-bearing capacity ratio RB/RA is not less than 1.6 and not more than 2.7, and the vertical load resistance (W1) is substantially coincident with the lateral load resistance (W3).

An area of (3) surrounded by broken lines indicates a range in which the angle θ is not less than 53° and not more than 72°, the load-bearing capacity ratio RB/RA is not less than 1.7 and not more than 2.7, and the floating load resistance (W2) and the lateral load resistance (W3) are substantially coincident with the vertical load resistance W1) within a range of ±20%.

An area of (4) surrounded by thick solid lines indicates a range in which the vertical load resistance W1), the floating load resistance W2), and the lateral load resistance W3) are practically substantially coincident with each other within a range of ±20%.

Further, a point (5) indicates a case in which the complete isotropy is obtained, representing the point of intersection between the characteristic curve C of W2/W1=1 and the characteristic curve H of W3/W1=1.

A point (6) indicates a case in which the lateral load resistance W3) is 1.2-fold and the floating load resistance W2) is 0.8 on the basis of the vertical load resistance W1) (W1:W2:W3=1:0.8:1.2), representing the point of intersection between the characteristic curve A of W2/W1=0.8 and the characteristic curve J of W3/W1=1.2.

As described above, when the angle θ formed by the axes of the horizontal roller 24 and the inclined roller 28 and the load-bearing capacity ratio (RB/RA) between the horizontal roller 24 and the inclined roller 28 are set to any one of (1) to (6) respectively, the load resistance in the predetermined direction is substantially constant even when the attachment posture of the base member 12 is changed.

Next, modified embodiments of the linear guide mechanism 10 according to the embodiment of the present invention are shown in FIGS. 9 to 12. The same constitutive components as those of the linear guide mechanism 10 shown in FIGS. 1 and 2 are designated by the same reference numerals, detailed explanation of which will be omitted. It is assumed that the angle θ formed by the axes of the horizontal roller 24 and the inclined roller 28 and the load-bearing capacity ratio in each case are the same as those of the embodiment described above.

Figure 9:
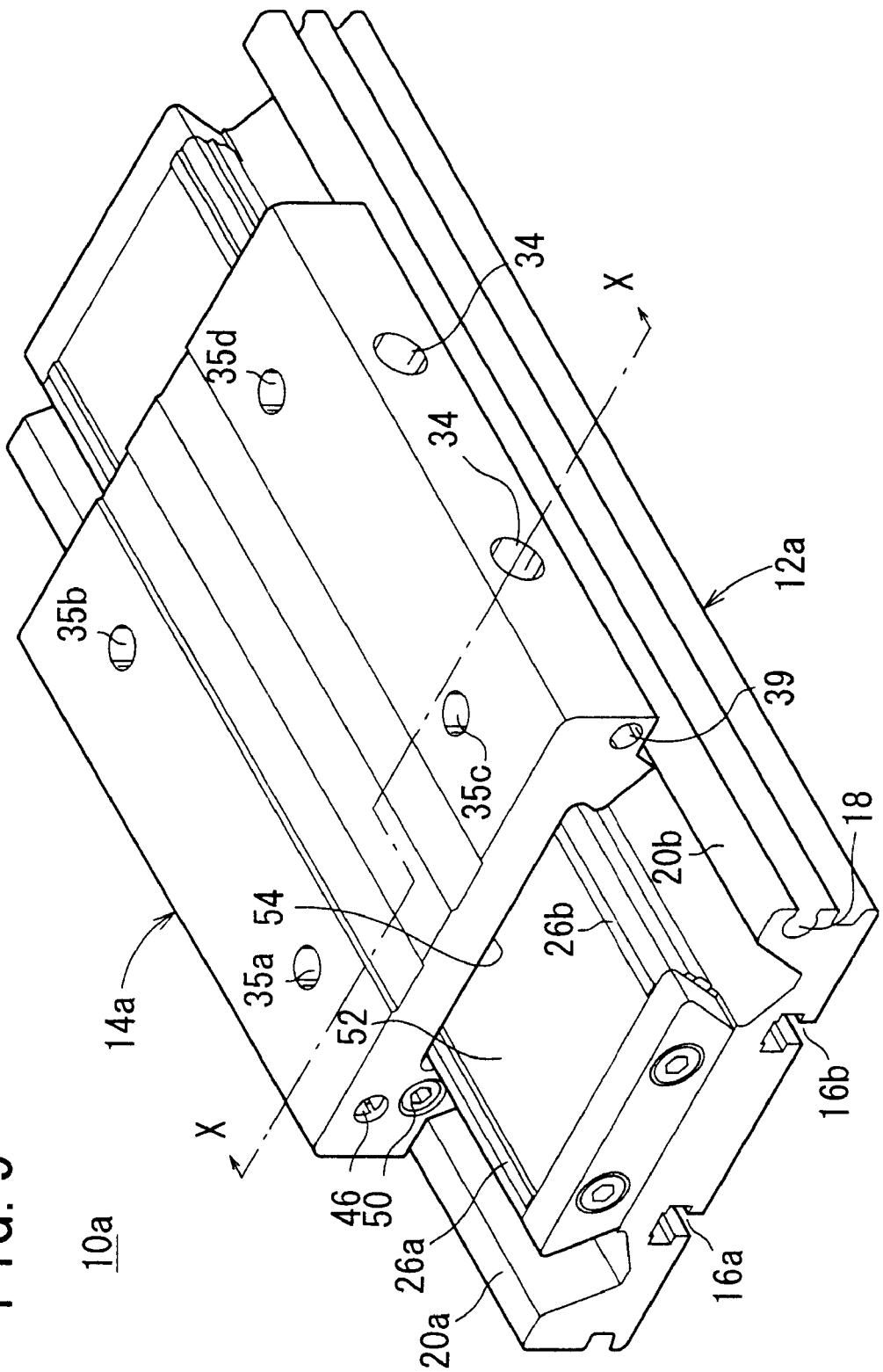
FIG. 9 is a perspective view illustrating a linear guide mechanism according to a first modified embodiment.
Figure 10:
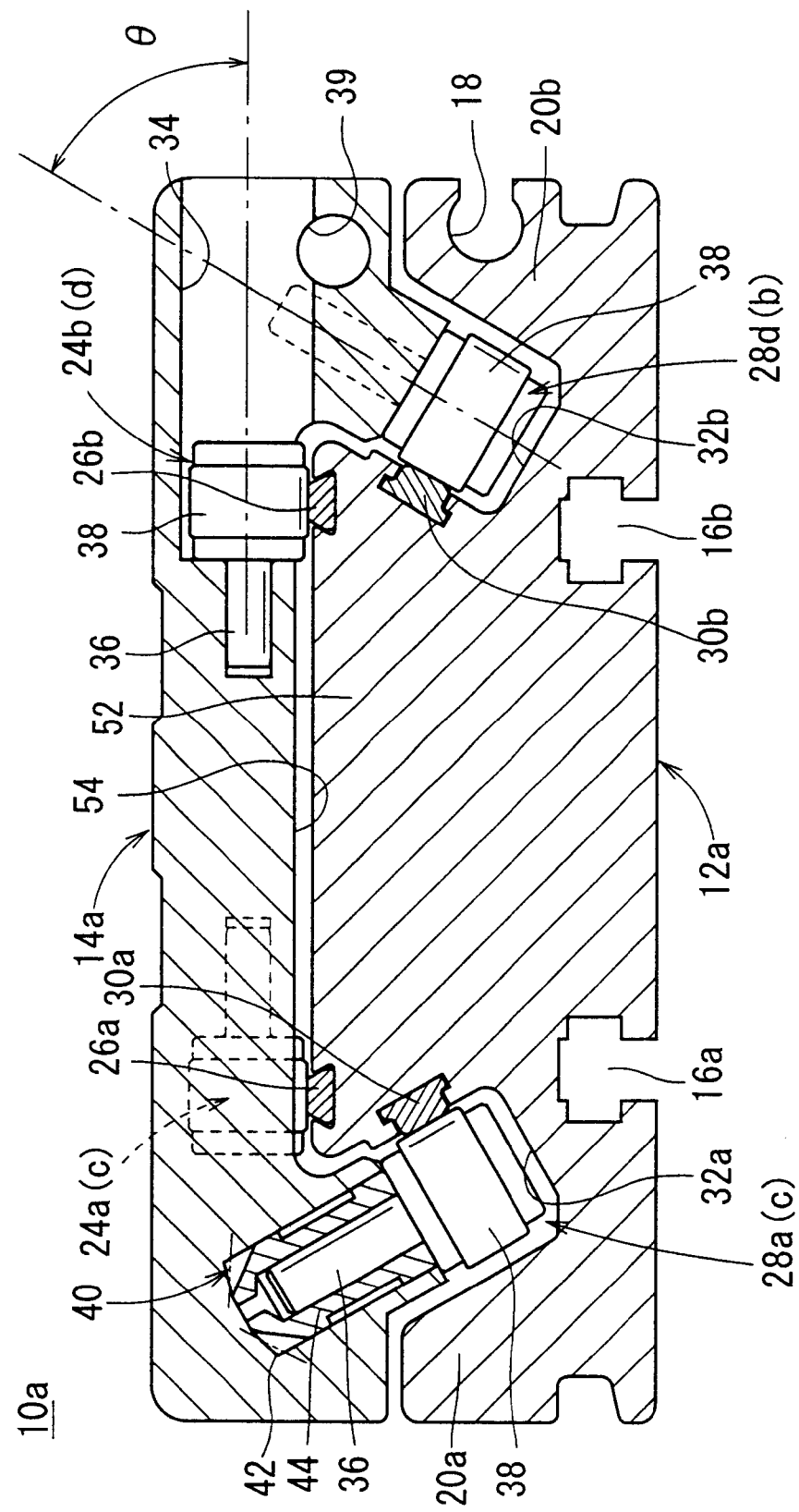
FIG. 10 is a vertical sectional view taken along a line X—X shown in FIG. 9.

A linear guide mechanism 10a according to a first modified embodiment shown in FIGS. 9 and 10 has the following feature. That is, a central portion of a base member 12a is expanded to form an expanded section 52. A horizontal surface of the expanded section 52 bears horizontal rollers 24a to 24d. Further, inclined surfaces, which are disposed closely to the horizontal surface, bear inclined rollers 28a to 28d respectively.

In other words, as shown in FIG. 10, the first modified embodiment is different from the embodiment of the present invention described above in that the four inclined rollers 28a to 28d are arranged outwardly, and the horizontal rollers 24a to 24d are arranged inwardly with respect to the inclined rollers 28a to 28d. A recess 54, which corresponds to the expanded section 52 of the base member 12a, is formed for a slider 14a.

Figure 11:
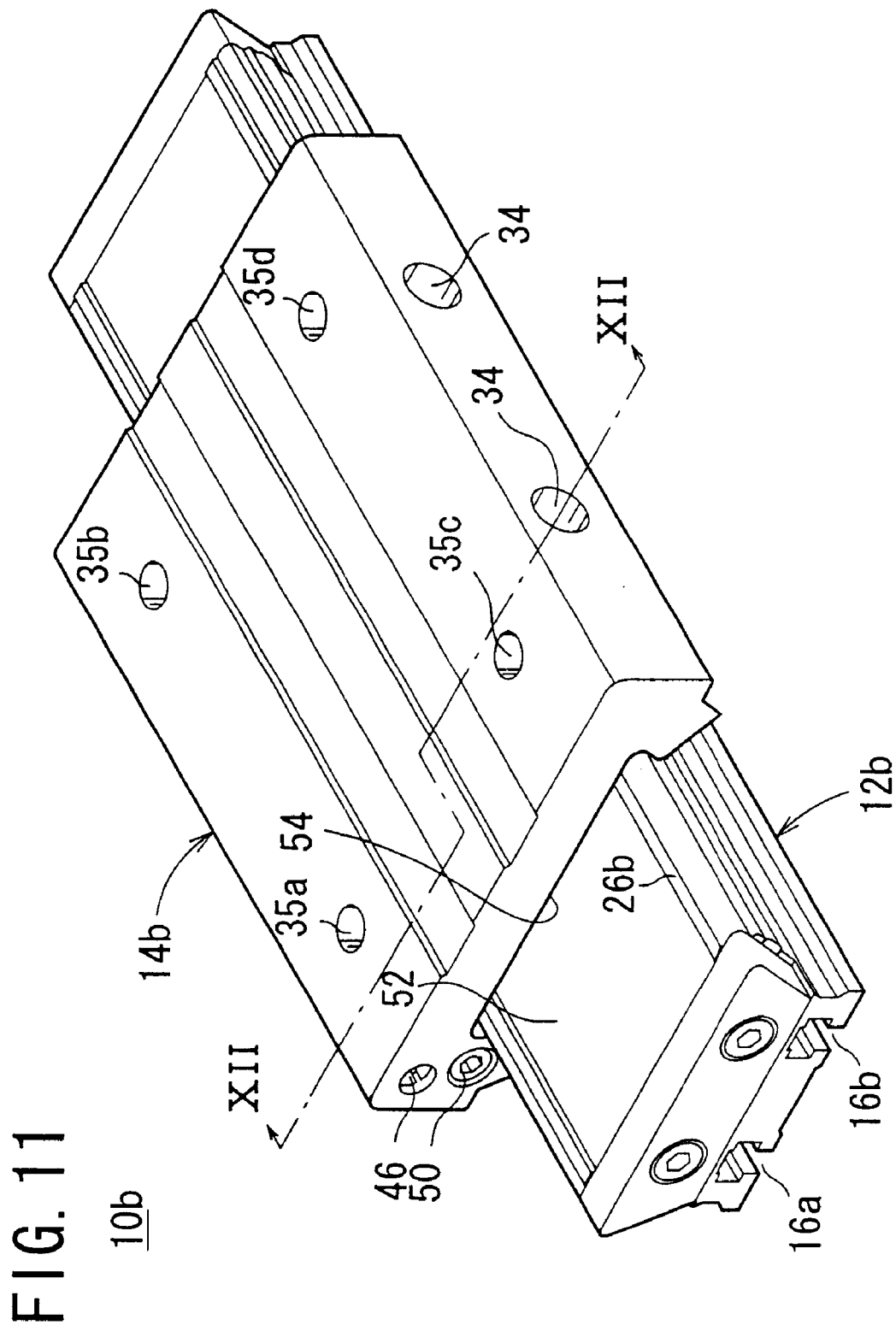
FIG. 11 is a perspective view illustrating a linear guide mechanism according to a second modified embodiment.
Figure 12:
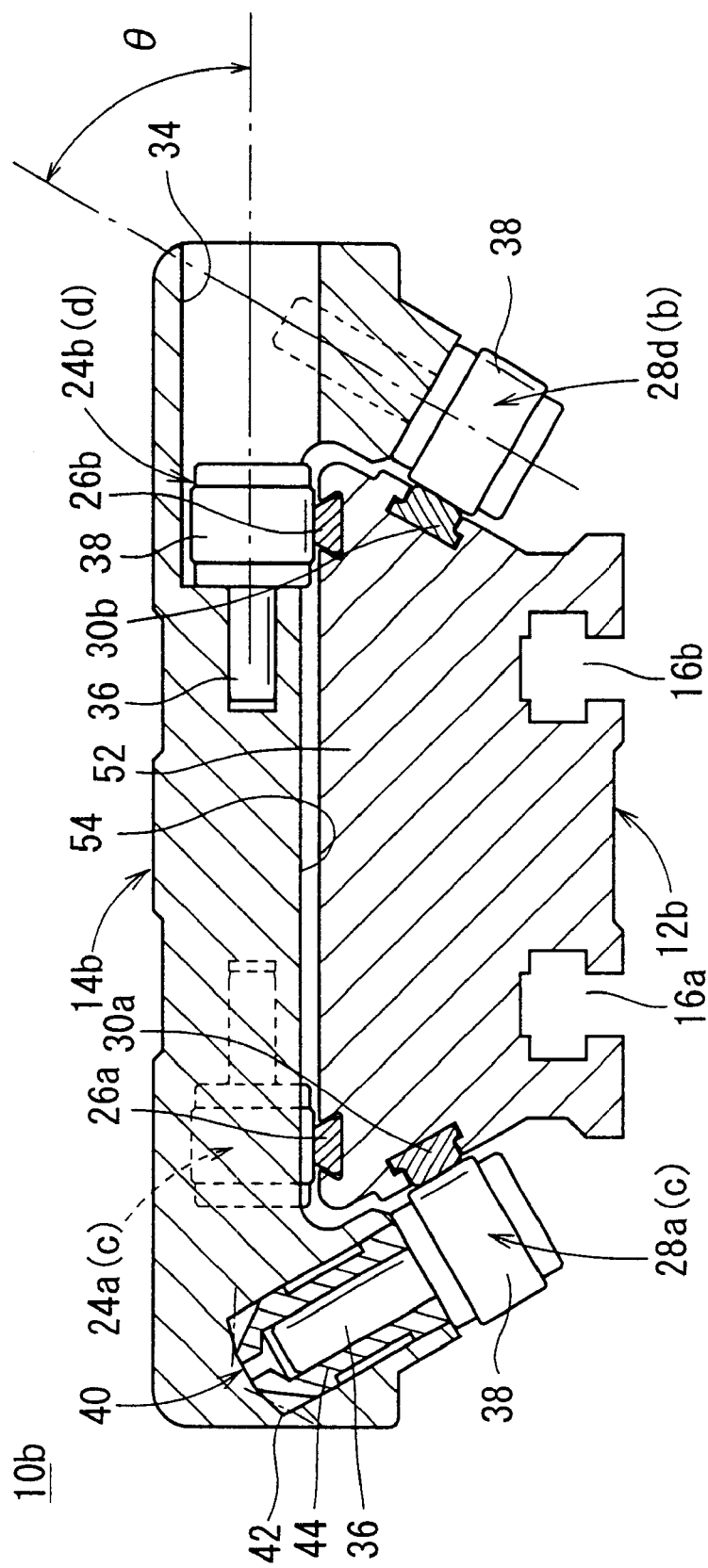
FIG. 12 is a vertical sectional view taken along a line XII—XII shown in FIG. 11.

A linear guide mechanism 10b according to a second modified embodiment shown in FIGS. 11 and 12 has the following feature. That is, the widthwise dimension of a base member 12b in the direction substantially perpendicular to the axial direction is shorter than the widthwise dimension of a slider 14b. Inclined rollers 28a, 28d, which are arranged on outer sides of the slider 14b, use guide surfaces of inclined rails 30a, 30b which are installed to inclined surfaces of side outer walls of the base member 12b.

Figure 13:
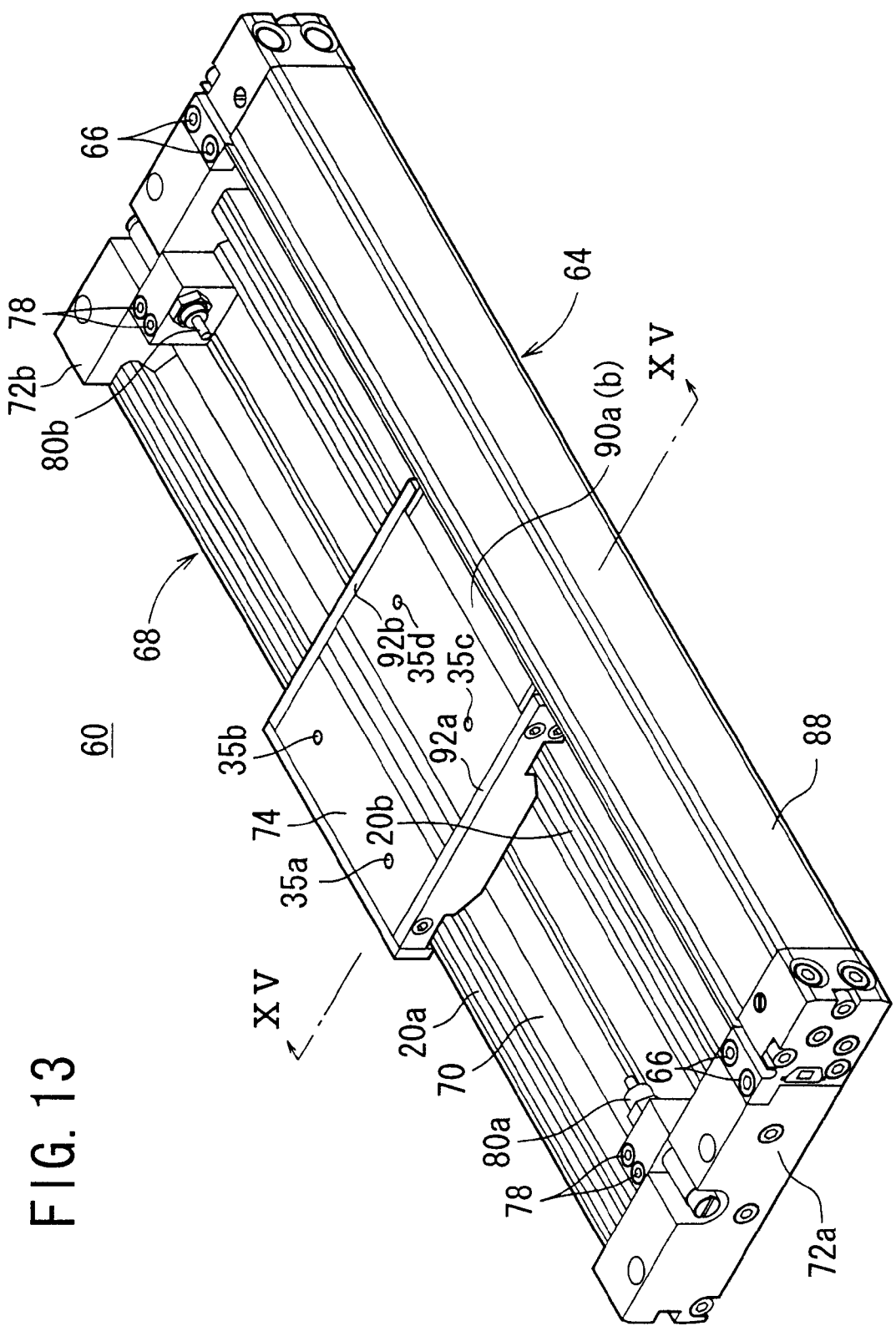
FIG. 13 is a perspective view illustrating a linear operation apparatus to which the linear guide mechanism shown in FIG. 1 is applied.
Figure 14:
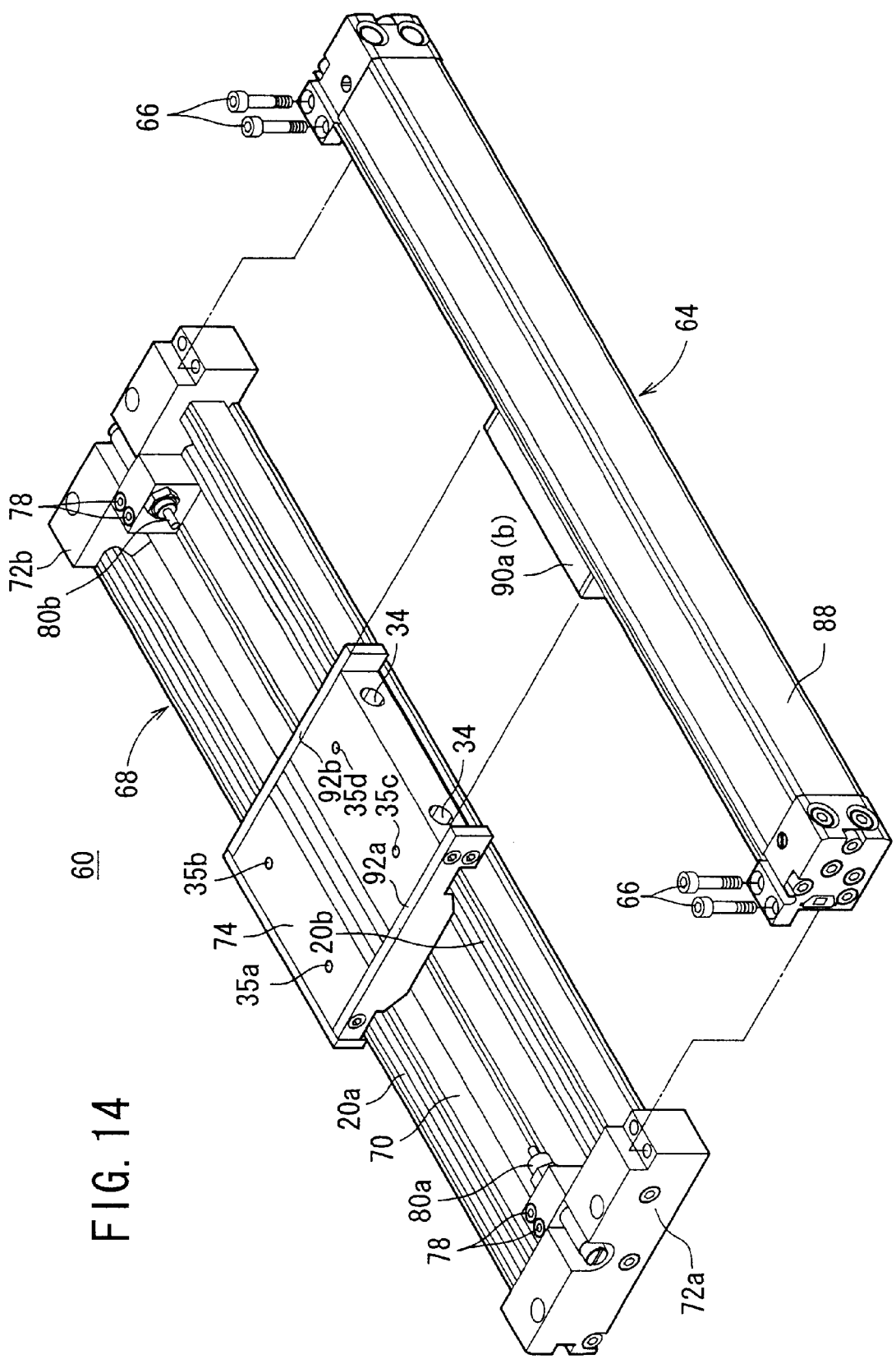
FIG. 14 is an exploded perspective view in which a driving section and a guide section of the linear operation apparatus shown in FIG. 13 are separated from each other.
Figure 15:
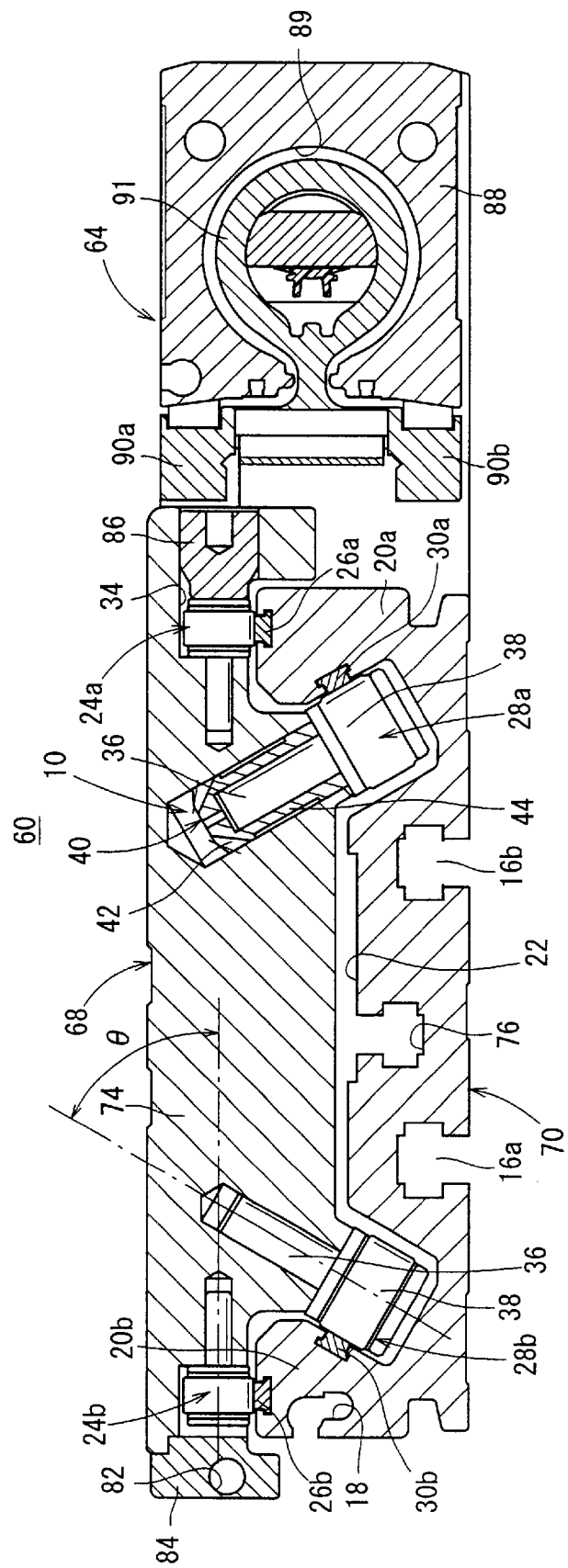
FIG. 15 is a vertical sectional view taken along a line XV—XV shown in FIG. 13.

Next, a linear operation apparatus 60, to which the linear guide mechanism 10 according to the embodiment of the present invention is applied, is shown in FIGS. 13 to 15.

The linear operation apparatus 60 comprises a driving section 64 which is composed of a rodless cylinder, and a guide section 68 which is arranged substantially in parallel to the driving section 64 and which is provided detachably with respect to the driving section 64 by the aid of screw members 66.

As shown in FIG. 15, the guide section 68 includes a base plate 70 on which pairs of horizontal rails 26a, 26b and inclined rails 30a, 30b are arranged substantially in parallel respectively, a pair of end blocks 72a, 72b (see FIG. 14) which are connected to both ends in the axial direction of the base plate 70 respectively, and a slider 74 which makes reciprocating motion in the axial direction of the base plate 70.

The guide section 68 further includes a linear guide mechanism 10 which is provided between the base plate 70 and the slider 74 and which guides the slider 74 in the axial direction of the base plate 70, and a pair of shock absorbers 80a, 80b (see FIG. 14) which are connected to absorber-fixing grooves 76 formed for the base plate 70 by the aid of screw members 78 to regulate the displacement terminal ends of the slider 74 and which absorb the shock applied to the slider 74.

The pair of shock absorbers 80a, 80b are provided displaceably along the absorber-fixing grooves 76 by loosening the screw members 78.

A plate 84, which has a magnet insertion hole 82, is installed to one side portion of the slider 74 disposed substantially perpendicularly to the displacement direction of the slider 74 (see FIG. 15). The magnetic field of a magnet (not shown) inserted into the magnet insertion hole 82 is sensed by an unillustrated sensor retained in a sensor attachment groove 18. Accordingly, the position of the slider 74 is detected. A closing member 86, which closes an insertion hole 34 for the horizontal roller 24, is provided on the other side portion of the slider 74.

As shown in FIG. 15, the driving section 64 is provided with a piston 91 which is slidably displaceable along a bore 89 formed in a cylinder tube 88. A pair of piston yokes 90a, 90b, which are displaceable integrally with the piston 91, are connected to the piston 91. In this arrangement, the pair of piston yokes 90a, 90b are installed between a pair of end plates 92a, 92b of the slider 74 (see FIG. 14) to function so that the rectilinear reciprocating motion of the piston 91 is transmitted to the slider 74.

As for the arrangement of the linear operation apparatus 60 other than the above, including the driving section 64, reference may be made to Japanese Laid-Open Patent Publication No. 2000-304004 (U.S. Pat. No. 6,308,821) proposed by the present applicant.

When the linear guide mechanism 10 according to the embodiment of the present invention is applied to the linear operation apparatus 60 for transporting a variety of workpieces, the transport weight can be supported substantially uniformly or equivalently to smoothly transport the workpiece irrelevant to the attachment posture of the linear operation apparatus 60 including, for example, the horizontal attachment, the ceiling attachment, and the wall surface attachment.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A linear guide mechanism having a base member and a slider which are displaceable relatively linearly, said linear guide mechanism comprising:
   a horizontal surface guide track and an inclined surface guide track which are formed in an axial direction of said base member;
   a first load-receiving element which is provided for said slider and which is engaged with said horizontal surface guide track; and
   a second load-receiving element which is provided for said slider and which is engaged with said inclined surface guide track, wherein
   an angle, which is formed by an axis of said first load-receiving element and an axis of said second load-receiving element, is θ, a load-bearing capacity of said first load-receiving element is RA, and a load-bearing capacity of said second load-receiving element is RB; and
   θ, RA, and RB are set so that $45° \leq θ < 90°$ and $1.2 \leq RB/RA \leq 2.7$ are satisfied, and thus each of load resistances of said first and second load-receiving elements is substantially constant in a predetermined direction even when attachment postures of said base member and said slider are changed.

2. The linear guide mechanism according to claim 1, wherein a clearance-adjusting section is provided for only said second load-receiving element, and said clearance-adjusting section adjusts a clearance between said second load-receiving element and said inclined surface guide track.

3. The linear guide mechanism according to claim 1, wherein θ, RA, and RB are set so that $45° \leq θ < 73°$ and $1.2 \leq RB/RA \leq 2.7$ are satisfied.

4. The linear guide mechanism according to claim 1, wherein θ, RA, and RB are set so that $45° \leq θ < 90°$ and $1.6 \leq RB/RA \leq 2.7$ are satisfied.

5. The linear guide mechanism according to claim 1, wherein θ, RA, and RB are set so that $53° \leq θ < 72°$ and $1.7 \leq RB/RA \; 2.7$ are satisfied.

6. The linear guide mechanism according to claim 1, wherein said angle θ, which is formed by said axis of said first load-receiving element and said axis of said second load-receiving element, is 60°, and said load-bearing capacity of said first load-receiving element is a half of said load-bearing capacity of said second load-receiving element.

7. A linear guide mechanism having a base member and a slider which are displaceable relatively linearly, said linear guide mechanism comprising:
   horizontal surface guide tracks and inclined surface guide tracks which are formed in a direction of an axis of said base member;
   at least a pair of horizontal rollers which are rotatably attached to said slider to roll along said horizontal surface guide tracks and which are arranged opposingly in a direction substantially perpendicular to said axis; and
   at least a pair of inclined rollers which are rotatably attached to said slider to roll along said inclined surface guide tracks and which are arranged opposingly in a direction substantially perpendicular to said axis, wherein
   an angle θ, which is formed by an axis of one of said horizontal rollers and an axis of one of said inclined rollers, is at least 45°, and a load-bearing capacity RB of said inclined rollers is greater than a load-bearing capacity RA of said horizontal rollers; and
   said horizontal rollers and said inclined rollers are set so that each of load resistances is substantially constant in a predetermined direction even when attachment postures of said base member and said slider are changed.

8. The linear guide mechanism according to claim 7, wherein
   θ, RA, and RB are set so that $45° \leq θ < 90°$ and $1.2 \leq RB/RA \leq 2.7$ are satisfied.

9. The linear guide mechanism according to claim 7, wherein a clearance-adjusting section is provided for only said inclined roller, and said clearance-adjusting section adjusts a clearance between a roller section of said inclined roller and said inclined surface guide track.

10. The linear guide mechanism according to claim 7, wherein
    θ, RA, and RB are set so that $45 \leq θ < 73°$ and $1.2 \leq RB/RA \leq 2.7$ are satisfied.

11. The linear guide mechanism according to claim 7, wherein
    θ, RA, and RB are set so that $45° \leq < 90°$ and $1.6 \leq RB/RA \leq 2.7$ are satisfied.

12. The linear guide mechanism according to claim 7, wherein
    θ, RA, and RB are set so that $53° \leq θ < 72°$ and $1.7 \leq RB/RA \leq 2.7$ are satisfied.

13. The linear guide mechanism according to claim 7, wherein θ is 60°, and RA is a half of RB.

* * * * *